United States Patent [19]

Röhm

[11] 4,272,087
[45] Jun. 9, 1981

[54] NONLOOSENING DRILL CHUCK

[76] Inventor: Günter H. Röhm, Heinrich-Röhm-Str. 50, 7927 Sontheim, Fed. Rep. of Germany

[21] Appl. No.: 90,345

[22] Filed: Nov. 1, 1979

[30] Foreign Application Priority Data

Nov. 4, 1978 [DE] Fed. Rep. of Germany ....... 2847927

[51] Int. Cl.³ ........................................... B23B 31/12
[52] U.S. Cl. ..................................... 279/62; 403/317; 403/328
[58] Field of Search ............................. 279/60, 61, 62; 403/317, 328

[56] References Cited

U.S. PATENT DOCUMENTS

| | | | |
|---|---|---|---|
| 1,296,501 | 3/1919 | Gary et al. | 279/72 X |
| 3,810,703 | 5/1974 | Pasbrig | 403/328 X |
| 4,213,623 | 7/1980 | Rohm | 279/60 X |

FOREIGN PATENT DOCUMENTS

| | | | |
|---|---|---|---|
| 2341642 | 3/1975 | Fed. Rep. of Germany | 279/60 |
| 2806797 | 8/1979 | Fed. Rep. of Germany | 279/60 |

*Primary Examiner*—Robert D. Baldwin
*Attorney, Agent, or Firm*—Karl F. Ross

[57] ABSTRACT

A chuck has a chuck body rotatable about a chuck axis and provided with a plurality of jaws which can be radially displaced toward one another by rotation of a tightening sleeve on the chuck body in a tightening direction and which can be displaced radially apart by rotation of the tightening sleeve in an opposite loosening direction. A latching pin is displaceable chordally in a blind bore of the chuck body and is urged radially outwardly. This latching pin is engageable between the teeth of an array of radially inwardly directed teeth formed on the tightening sleeve. The spring of the locking pin presses this pin chordally forwardly into engagement with the teeth with the edge defined between the side and end surfaces of the pin fitting between two adjacent teeth and the end surface flatly engaging one of the front flanks with the side surface engaging the back flank of the tooth immediately trailing this one back flank in the loosening direction. An unlocking element can be rotated on the chuck to displace the locking pin chordally inwardly out of engagement with the teeth.

8 Claims, 2 Drawing Figures

NONLOOSENING DRILL CHUCK

FIELD OF THE INVENTION

The present invention relates to a nonloosening drill chuck, that is a chuck which, once tightened, will not under normal operating conditions be able to vibrate itself loose.

BACKGROUND OF THE INVENTION

A chuck normally has a chuck body rotatable about an axis and carrying a plurality of angularly spaced jaws. A tightening body provided on the chuck body can be rotated relative to the chuck body to displace the jaws radially inwardly toward one another when the tightening body is rotated in a tightening direction about the axis of the chuck body, and to displace the jaws radially apart on rotation of the tightening body relative to the chuck in an opposite loosening direction. It is also known to provide mechanism in the chuck which converts forces exerted on the jaws during rotation in one direction into countervailing forces that tighten these jaws.

Nonetheless it is frequently necessary, as in a hammer drill, to provide further mechanism to prevent rotation of the tightening body in the loosening direction on the chuck body as a result of vibration during use. Thus my copending applications Ser. Nos. 011,722; 011,773; and 011,774 all filed Feb. 13, 1979 show various expedients used for relatively locking the tightening and chuck bodies against rotation of the tightening body on the chuck body in the loosening direction. Further such arrangements can be seen in German utility models Nos. 7,222,008 and 7,524,037, as well as in German patent publications Nos. 2,133,142, 2,341,642, and 2,639,214 and in U.S. Pat. No. 1,296,501.

The various nonloosening chucks have a locking element provided either on the tightening body or chuck body and engageable with teeth on the other body. Normally the locking body is carried on the chuck body and the teeth are formed on the tightening body, which itself is formed as a sleeve surrounding the chuck body. In order to ensure that the chuck body can only loosen at most a small amount, the teeth are made as fine as practical, and the locking element is provided with a small tip that can engage between the teeth. The fineness of the ratcheting or indexing can even be increased by providing several such locking elements which are spaced apart by angular distances not equal to whole-number multiples of the angular tooth spacing, so that the various locking elements will engage one after the other and will provide a number of locking positions equal to a multiple of the number of teeth.

The considerable disadvantage with this type of system is that the effort to make the indexing as fine as possible leaves the elements which hold the chuck and tightening bodies against relative rotation extremely small. Thus the teeth are very fine and the tooth or engaging part of the locking element is also extremely small. As a result the angular forces which these elements can resist are also correspondingly small. It is not uncommon for such a chuck to fail, normally by simply stripping of the teeth in the tightening sleeve or breaking-off of the tooth or teeth of the locking element.

OBJECTS OF THE INVENTION

It is therefore an object of the present invention to provide an improved nonloosening chuck.

Another object is to provide such a chuck wherein relatively fine indexing or ratcheting of the locking element is possible, but wherein the locking element can withstand considerable torsional forces.

SUMMARY OF THE INVENTION

These objects are attained according to the instant invention in a chuck of the above-described general type, but wherein one of the bodies is provided with an array of radially directed teeth having relative to the tightening direction a front flank and a rear flank. A latching pin is displaceable chordally in the other body and has a side surface and outer end surface together forming an edge. Biasing means provided between this pin and the other body urges the pin chordally forwardly into engagement with the teeth with the pin edge fitting between two adjacent teeth and the end surface engaging one of the front flanks and the side surface engaging the rear flank of the tooth immediately trailing the one front flank in the loosening direction. A locking element is provided for displacing this pin against the biasing means chordally backwardly out of engagement with the teeth.

Thus with the system according to the instant invention a relatively heavy-duty locking pin can engage with an edge between the teeth of the other body, normally the locking element being mounted in the chuck body and the teeth being formed on the inside of a sleeve constituting the tightening body.

According to this invention the flanks of the teeth are substantially planar, and the end surface engages the front flanks flatly while the side surface engages the back flanks at least in line contact. In fact with a square-section locking pin it is possible for the side surface to engage the back flanks in surface contact. In either case substantially more contact is possible with the system according to the instant invention than with the prior-art systems wherein point contact was almost exclusively relied upon.

According to another feature of this invention the locking pin is displaceable chordally in a complementarily shaped blind bore in the chuck body. A compression screw between the rear end of this pin and the bottom of the bore acts as the biasing means. Thus the forces effective in the direction tending to open the chuck will be mainly effective in a direction perpendicular to the chord along which the locking pin is displaceable in the chuck body. Thus the tip of this locking pin will simply be compressed between the back flank its one side is braced against and the bore against which its other side bears. This force will have no vector in a direction tending to displace the locking pin backwardly, so that the arrangement is capable of withstanding substantially greater forces without opening than has been hitherto possible.

According to another feature of this invention the unlocking element is constituted as a tube surrounding the chuck body and lying inside the tightening sleeve. This tube is formed with one or more apertures that can be aligned chordally with the locking pin to allow it to engage the teeth of the tightening sleeve. An edge of this aperture, however, can be displaced into contact with the end surface of the locking pin to displace it chordally backwardly out of engagement with the teeth. The provision of several such apertures makes it possible to unlock the chuck in any of various positions of the unlocking tube. Similarly it is possible to provide retaining means in the form of a spring-loaded ball engageable with another one of the apertures in a position with one of these apertures aligned with the locking element, so as to prevent accidental unlocking of the chuck.

SPECIFIC DESCRIPTION

Figure 1:
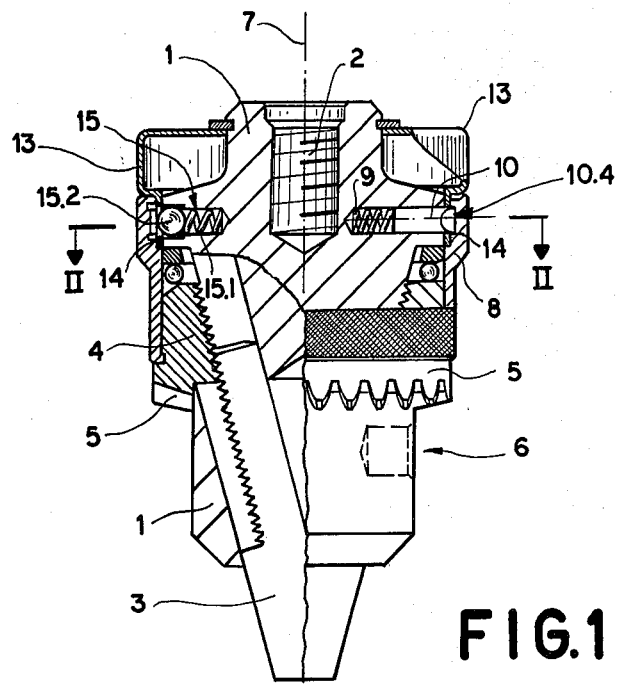
FIG. 1 is an axial section through a chuck according to this invention.

As seen in the drawing a chuck according to the instant invention has a chuck body 1 formed with a threaded hole 2 by means of which the body 1 can be mounted on the spindle of a drill or the like. It is noted in this context that the principles of the instant invention could equally well be applied to a lathe chuck or similar workpiece or tool holder. The chuck body 1 carries three jaws 3 and has a tightening body constituted as a ring 4 which can be rotated relative to the body 1 in one direction 16 (FIG. 2) to move the jaws 3 radially toward each other relative to an axis 7 about which the chuck is rotated, or in the opposite direction 12. (FIG. 2) to move the jaws 3 radially apart. The principle of operation of such a chuck can be seen from my earlier U.S. Pat. No. 3,938,817. The tightening ring or sleeve 4 has an array of axially projecting teeth 5 so that a standard chuck key can be inserted in a hole 6 in the body 1 to tighten or loosen the jaws 3.

According to this invention, the tightening sleeve 4 is provided with a backwardly extending toothed skirt 8 whose teeth have front flanks 8.1 and back flanks 8.2 relative to the lossening direction 16. A cylindrical locking pin 10 is displaceable along an axis 10.1 in a chordal blind bore 11 of the chuck body 1. A compression ring 9 biases the pin 10 chordally forwardly, that is toward the outside, so that its planar end face 10.2 lies against one of the front flanks 8.1 and its side surface 10.3 lies against the back flank immediately proceeding this one front flank in the loosening direction 16, with the edge 10.4 lying at the base between these two flanks 8.1 and 8.2.

Figure 2:
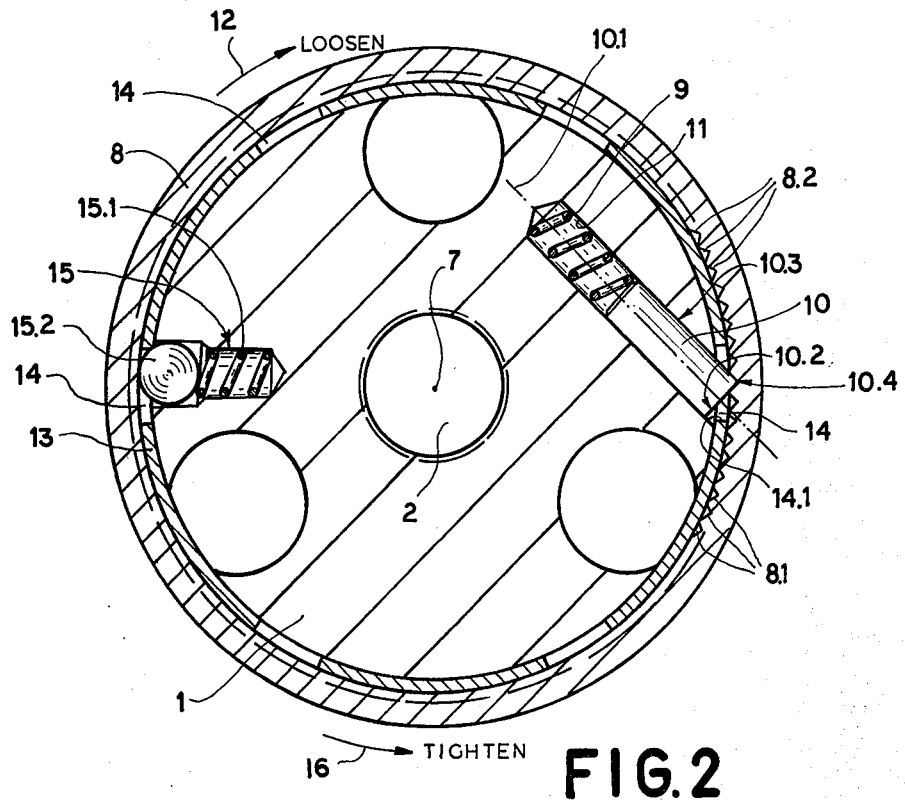
FIG. 2 is a large-scale section taken along II—II of FIG. 1.

Thus it is clear from FIG. 2 when the sleeve 4 with the skirt 8 is rotated relative to the body 1 in the tightening direction 16 the front flanks 8.1 will merely cam the pin 10 along its axis 10.1 chordally inwardly. Once tightened, forces effective to rotate the skirt 8 in the loosening direction 12 will merely bring the trailing flanks 8.2 into good line contact with the side surface 10.3 of the pin, locking it in a direction perfectly perpendicular to its axis 10.1 in the bore 11 so that the skirt 8, and with it the ring 4, will be completely prevented from rotating in the direction 12 relative to the body 1.

According to this invention an unlocking element in the form of a tube or sleeve 13 is provided having six angularly equispaced windows 14 each having relative to the tightening direction a rear edge 14.1 that can engage the end surface 10.2 of the pin 10. When this tube 13 is rotated in the tightening direction it can therefore cam the pin 10 inwardly out of contact with the teeth flanks 8.1 and 8.2 to allow the ring 4 to be rotated in the loosening direction 12 relative to the body 1.

A retaining mechanism 15 constituted as a spring 15.1 radially outwardly biasing a ball 15.2 in the chuck body 1 is provided to loosely retain the unlocking tube 13 in a position with one of its windows 14 chordally aligned with the pin 10. This mechanism prevents vibration from rotating the sleeve 13 to unlock the pin 10.

Thus with the system according to the instant invention a relatively large pin 10 can be brought into extremely good blocking position with the teeth of the skirt 8, so as effectively to prevent it from rotating in the loosening direction 12. The pin 10 is relatively massive, and the forces effective on it are transmitted purely as compression forces to the side of the bore 11, so that unloosening of the chuck according to this invention, even when stressed with very great force in the loosening direction, is unlikely.

I claim:

1. A chuck comprising:
    a chuck body rotatable about a chuck axis;
    a plurality of jaws radially displaceable on said chuck body;
    a tightening body rotatable about said axis on said chuck body;
    means including interengaging formations on said tightening body and on said jaws for displacing said jaws radially inwardly on rotation of said tightening body relative to said chuck body in a tightening direction and for displacing said jaws radially outwardly on rotation of said tightening body relative to said chuck body in an opposite loosening direction;
    an array of radially directed teeth formed on one of said bodies and centered on said axis, each tooth having relative to said loosening direction a front flank and a rear flank;
    a latching pin displaceable chordally in the other of said bodies and having a side surface and an outer end surface together forming an edge;
    biasing means between said pin and said other of said bodies for urging said pin chordally forwardly into engagement with said teeth with said edge fitting between two adjacent teeth and said side end surface engaging one of said front flanks and said surface engaging the back flank of the tooth immediately trailing said one front flank in said loosening direction; and
    means including an unlocking element on said chuck body for displacing said pin against said biasing means chordally backwardly out of engagement with said teeth.

2. The chuck defined in claim 1 wherein said flanks and said end surface are substantially planar and said end surface is engageable in surface contact with said front flanks, said side surface being engageable at least in line contact with said back flanks.

3. The chuck defined in claim 2 wherein the back flank of each tooth is generally perpendicular to the respective front flank.

4. The chuck defined in claim 3 wherein said tightening body includes a tightening sleeve and constitutes said other of said bodies.

5. The chuck defined in claim 4 wherein said unlocking element is displaceable angularly on said chuck body and is engageable backwardly against said end surface.

6. The chuck defined in claim 5 wherein said unlocking element is a tube centered on said axis and having at least one radially throughgoing window having an edge engageable with said end surface on rotation of said tube on said chuck body.

7. The chuck defined in claim 6 wherein said means including said unlocking element includes means for retaining said end surface.

8. The chuck defined in claim 4 wherein said chuck body is formed with a blind chordal bore slidable receiving said pin, said biasing means being a spring in said bore behind said pin.

* * * * *